(12) United States Patent
Lazier et al.

(10) Patent No.: US 7,647,338 B2
(45) Date of Patent: Jan. 12, 2010

(54) CONTENT ITEM QUERY FORMULATION

(75) Inventors: Ariel Lazier, Seattle, WA (US); Hugh J. Williams, Redmond, WA (US); Nick Craswell, Cambridge (GB); Charles Clarke, Waterloo (CA); Julia H. Farago, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 225 days.

(21) Appl. No.: 11/677,180

(22) Filed: Feb. 21, 2007

(65) Prior Publication Data

US 2008/0201315 A1 Aug. 21, 2008

(51) Int. Cl.
*G06F 17/00* (2006.01)

(52) U.S. Cl. .............................. 707/102; 707/3; 707/10; 707/101; 707/103 R; 707/104.1

(58) Field of Classification Search ...................... 707/2, 707/3, 4, 10, 1, 101, 102, 103 R, 104.1; 705/26; 709/219; 715/208; 703/3, 4, 5, 10; 701/208
See application file for complete search history.

(56) References Cited

U.S. PATENT DOCUMENTS

| | | | | |
|---|---|---|---|---|
| 6,301,584 | B1 * | 10/2001 | Ranger | 707/103 R |
| 6,526,440 | B1 * | 2/2003 | Bharat | 709/219 |
| 6,754,873 | B1 * | 6/2004 | Law et al. | 715/208 |
| 7,162,471 | B1 * | 1/2007 | Knight et al. | 707/3 |
| 2002/0120619 | A1 * | 8/2002 | Marso et al. | 707/3 |
| 2004/0143564 | A1 * | 7/2004 | Gross et al. | 707/1 |
| 2005/0033657 | A1 * | 2/2005 | Herrington et al. | 705/26 |
| 2005/0132018 | A1 | 6/2005 | Milic-Frayling et al. | |
| 2005/0132296 | A1 | 6/2005 | Milic-Frayling et al. | |
| 2005/0132297 | A1 | 6/2005 | Milic-Frayling et al. | |
| 2006/0031214 | A1 * | 2/2006 | Solaro et al. | 707/4 |
| 2006/0074873 | A1 * | 4/2006 | Dettinger et al. | 707/3 |
| 2006/0271526 | A1 * | 11/2006 | Charnock et al. | 707/3 |
| 2007/0067297 | A1 * | 3/2007 | Kublickis | 707/9 |
| 2007/0118533 | A1 * | 5/2007 | Ramer et al. | 707/10 |
| 2007/0250492 | A1 * | 10/2007 | Angel et al. | 707/4 |
| 2008/0033919 | A1 * | 2/2008 | Arrouye et al. | 707/3 |
| 2008/0059453 | A1 * | 3/2008 | Laderman | 707/5 |
| 2009/0094216 | A1 * | 4/2009 | Hou et al. | 707/4 |
| 2009/0177381 | A1 * | 7/2009 | Taniguchi et al. | 701/208 |

OTHER PUBLICATIONS

Muriel Foulonneau et al., "Using collection descriptions to enhance an aggregation of harvested item-level metadata", ACM, 2005, pp. 32-41.*

(Continued)

*Primary Examiner*—Thuy N Pardo
(74) *Attorney, Agent, or Firm*—Shook, Hardy & Bacon, LLP

(57) ABSTRACT

A system and method for formulating a related content query are provided. A search engine receives queries having terms for content items and stores the queries and user interaction data in a query log. Also, the search engine provides a collection of content items and related content item queries for each content item within the collection of content items, in response the queries. Each content item in the collection of content items includes terms that match the received queries. The related content item queries are generated by an advisor engine that processes the query log and each content item in the collection of content items to select query terms, different from the received query terms, which previously resulted in a specified content item being accessed or selected.

19 Claims, 7 Drawing Sheets

OTHER PUBLICATIONS

M.L. Kherfi et al., "Image retrieval from the world wide web issues, techniques, and systems", ACM, 2004, pp. 35-67.*

Thomas Funkhouser et al., "Shape-based retrieval and analysis of 3D models", ACM, Aug. 2004, pp. 1-136.*

* cited by examiner

CONTENT ITEM QUERY FORMULATION

BACKGROUND

Conventionally, search systems receive a query containing search terms and display results that match the search terms on multiple pages. Such conventional search systems typically display search results in the form of a list of uniform resource locators (URLs) to the user that provided the search terms. Depending on a scope associated with the search terms provided by the user, the list of uniform resource locators may span between one and several hundred pages.

For instance, a search for the web pages that include the term "car" may produce more than ten thousand results-a seemingly infinite number when the user is viewing them ten or twenty at a time. Conventional search systems rank the URLs included in the results and distribute the URLs across multiple pages based on the relative rank of the results. Consequently, multiple pages having ten or twenty URLs are generated, and the user may access each page to view the URLs that link to web pages that contain the terms included in the user's query.

Browsing the large list of URLs can become cumbersome and very time-consuming because only a fraction of the URLs can be viewed on the display device associated with the user. When a particular URL from the large list is selected for more-detailed viewing, the user must remember the URL or generate a new window to save the URL before returning to browsing other URLs in the large list. If the user does not remember the URL or open a new window to save the URL, after clicking on other URLs in the large list, the user may not be able quickly locate the particular result in the large list of URLs.

SUMMARY

Embodiments of the invention relate to formulating related content item queries and tracking access patterns in a large collection of content items that are provided by a search engine in response to a query. Upon receipt of a query, the search engine generates a collection of content items that is presented on a single page. The single page may include an infinite scroll component that enables the user to scroll through the collection of content items, if the collection of content items is larger than a specified threshold. For one or more content items in the collection, a related content item query may be generated and presented therewith. The related content item query enables a user to access additional content items that are similar to a specified content item. If desired, the scroll bar associated with the page of content items may dynamically provide a visual indication of selection frequency, hover frequency, and/or relative position of content items that where hovered or selected during traversal of the query results page.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, embodiments of the present invention are described in detail below with reference to the attached drawing figures, which are incorporated in their entirety by reference herein.

As utilized herein "content items" include, but are not limited to, any combination of video files, audio files, text files, uniform resource locators, or thumbnails. Additionally, throughout the description the term "component" refers to any combination of software, firmware and hardware; and the term "select" refers to, but is not limited to, choosing or picking out in preference to another or others, clicking on an item out of a group of items, or pressing—one of the buttons on a pointer, i.e., mouse—and releasing instantaneously or holding down after first positing a cursor of the pointer on an appropriate part of the display screen of a computing device to activate a program function or to choose a particular item.

Embodiments of the present invention provide user interfaces for presenting related content items queries, domain queries, and access indicators on a single page that contains a collection of content items that match terms included in a query that was transmitted to and processed by a search engine. If desired, the single page may include an infinite scrolling component. The search engine receives the query from a user and generates the collection of content items. The queries received by the search engine are stored in a query log. In some embodiments, the query log also stores user interaction data that corresponds to user behavior monitored during previous search sessions and/or a current search session. In an embodiment, an advisor engine communicates with the search engine and provides suggestions that include related content item queries and domain queries based on, among other things, queries associated with previous search sessions, and user interaction data stored in the query log. In an alternate embodiment, the suggestions may be provided to the search engine when a hover time associated with a particular content item included in the collection of content items exceeds a specified threshold.

Figure 1:
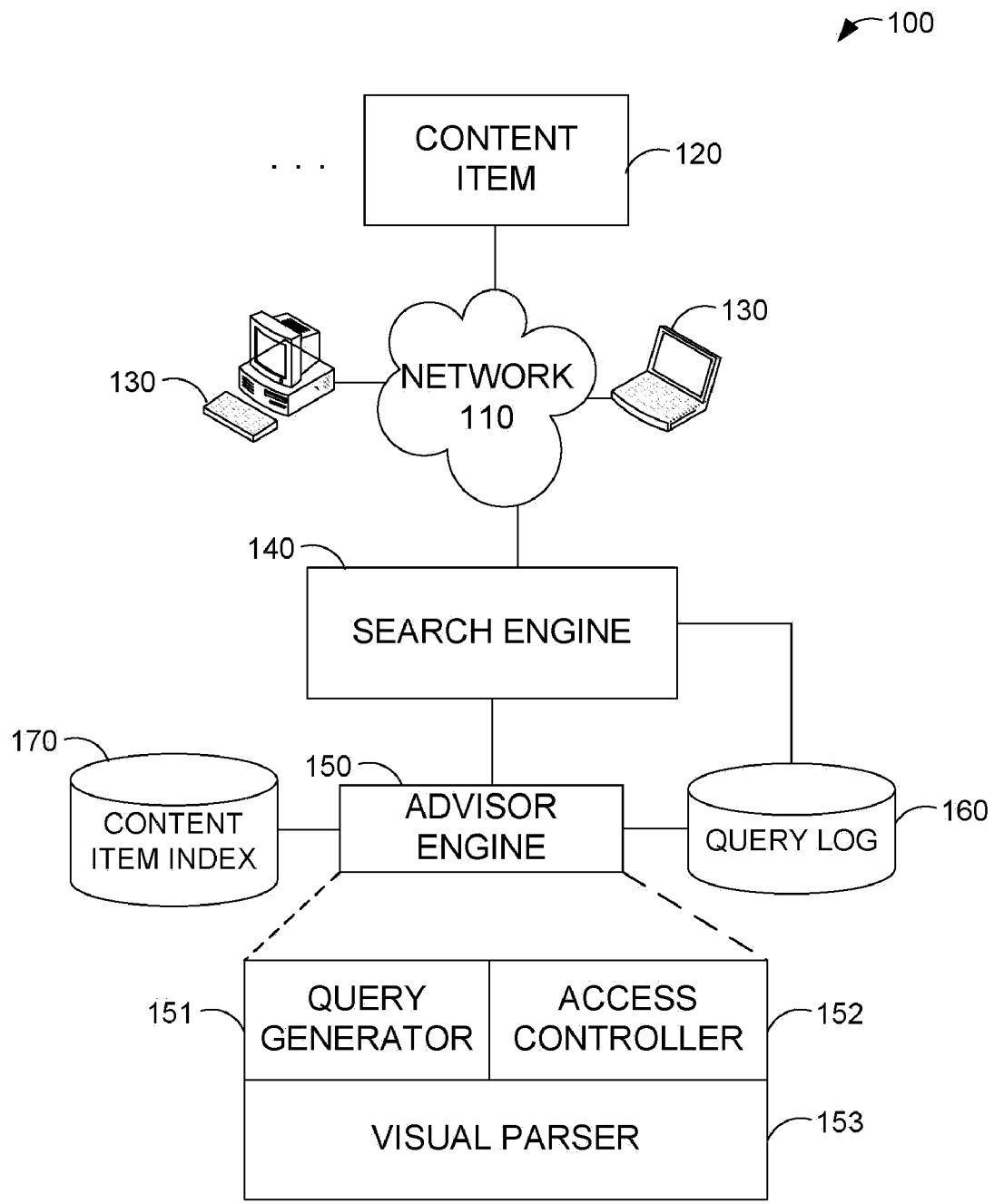
FIG. 1 is a network diagram that illustrates an exemplary operating environment, according to embodiments of the present invention.

FIG. 1 is a network diagram that illustrates an exemplary operating environment 100, according to embodiments of the present invention. The operating environment includes a network 110, content items 120, client devices 130, a search engine 140, an advisor engine 150, a query log 160, and a content item index 170.

The network 110 is configured to facilitate communication between the client devices 130, the search engine 140, and the content items 120. The network 110 may be a communication network, such as a wireless network, local area network, wired network, or the Internet. In an embodiment of the present invention, one or more of the client devices 130 communicate query terms to the search engine 140 utilizing the network 110. In response, the search engine 140 may communicate references to content items that match the query terms to the one or more client devices 130 utilizing the network 110.

Each content item 120 may include multimedia items, web pages, videos, text, URLs or images. In some embodiments, the content items 120 are stored on server computers or personal computer. Each content item 120 may be associated with content item metadata, such as, for example, a file name, a file size, a date the content was modified, or a date the content item was accessed. The content item metadata may be stored locally on a server or personal computer or remotely on a query log or database 160 associated with the search engine 140.

The client devices 130 may be utilized by a user to provide query items to the search engine 140 via the network 110. Each client device 130 may include, without limitation, personal digital assistants, smart phones, laptops, personal computers, or any other suitable computing device. The client devices 130 are configured to receive a collection of content items from the search engine 140 in response to a search query. The user may utilize the client devices 130 to traverse the collection of content items received from the search engine 140.

The search engine 140 is configured to receive the query terms provided by the client devices 130. The search engine 140 is further configured to store the query terms in the query log or database 160. Also, the search engine 140 is configured to process the query terms and generate content items or references to content items that match the query terms. In certain embodiments, the search engine 140 may transmit the collection of content items to one or more of the client devices 130 and track a user's interaction with the collection of content items. The user's interaction may be stored as user interaction data that includes user behavior, such as, e.g., content item selection frequency, content item hover frequency, click-through rates, and any other suitable user behavior information. The search engine 140 may receive suggestions from the advisor engine 150 to augment the collection of content items provided to the client device(s) 130 with additional data. By way of example only, such suggestions may include, related content item queries or domain queries, content item metadata, such as file name and file size, and indicators that graphically illustrate selection and hover patterns. The suggestions may be generated based on data stored in the query log 160 or content item index 170. In certain embodiments, the suggestions may be generated based on a hover time associated with a particular content item.

In an embodiment of the present invention, the advisor engine 140 includes a query generator component 151, an access controller component 152, and a visual parser component 153. The advisor engine 140 is configured to provide suggestions based on the data stored in the content item index 170 or the query long 160. The query generator component 151 may generate, by way of example only and not limitation, domain queries, related content item queries, or a peek box that may include the domain queries, related content item queries, content item metadata or content items that match a query received from the client devices. In some embodiments, the query generator component 151 is configured to communicate with the visual parser component 153 and/or the query log 160 to generate the related content item queries, domain queries, or peek box. The query generator component 151 is configured to extract (from query log 160) query terms associated with previous search sessions that led a user at a client device 130 to a particular content item in the collection of content items. In certain embodiments of the present invention, when generating related content item queries, the query generator component 151 may be configured to include, among other things, content item queries that return a display of one or more popular results included in a group of results available from all content item queries. The one or more popular results may include results that are selected at a high frequency.

The query generator component 151 may receive terms from the visual parser component 153 and utilize the terms to generate the related content item queries. In certain embodiments, the visual parser component 153 may parse a URL associated with a particular content item, tables that store the particular content item, or pages associated with the particular content item. The visual parser component 153 may extract terms from a title, alternative text, caption, or other suitable sources associated with the particular content item. The visual parser component 153 suggests the terms to the query generator, which in turn, utilizes the suggested terms and may include the terms in a related content item query, domain query, or peek box based on the query terms stored in the query log or the user interaction data.

The access controller component 152 tracks current user access data, such as hover frequency, hover time, and selection frequency to provide visual indicators to the search engine 140. In turn, the search engine 140 may utilize the visual indicators to update a user interface that presents the collection of content items to the client device 130. In an embodiment, the search engine 140 updates an infinite scroll component associated with the user interface by providing colored regions or other visual marks that inform the user of hovers and selections that occurred during a current search session. The marks enable a client device 130 to quickly locate and navigate to content items that were selected or hovered-over. Also, the access controller 152 may trigger a peek box that provides a subset of content items, the related content item queries, or domain queries based on a hover time associated with a particular content item. In some embodiments, the access controller 152 measures connection speed to determine a quality or size associated with the content items included in the collection of content items.

The content item index 170 is configured to store references to content items and a term frequency associated with one or more content items. In some embodiments, the content item index 170 may store thumbnails having varying sizes and quality. Based on a connection speed measured by the advisor engine 150, thumbnails of a suitable size or quality and associated with the collection of content items are selected and transmitted in response to queries provided by one or more of the client devices 130. In some embodiments, large or high quality thumbnails are provided in the collection of content items when the connection speed is fast. Alternatively, when the connection speed is slow, small or low quality thumbnails are provided in the collection of content items.

Additionally, the content item index 170 may include content item metadata, such as, for example, file name, file size, date modified, and any other suitable metadata. The advisor engine 150 utilizes the content item index 170 to generate the related content item query, domain query, or peek box. The query log 160 stores queries provided during previous search sessions. Also, the query log 160 stores user interaction data associated with a collection of content items. The user interaction data includes, among other things, selection frequency, click-through rates, hover time, and hover frequency. The search engine 140 receives queries from the client devices 130 and sends the terms associated therewith to the query log 160 for storage. Also, the search engine 140 may monitor the client devices 130 to produce user interaction data that is transmitted to the query log for storage. The advisor engine 150 utilizes the query logs 160 and content item index 170 to generate appropriate suggestions, which may update the single page and scroll bar that the search engine 140 transmits to the client devices 130.

One of ordinary skill in the art understands and appreciates that the operating environment 100 has been simplified for description purposes and that alternate operating environments are within the scope and spirit of the above description.

In response to a user query, the search engine 140 may transmit a collection of content items that match one or more of the terms included in the user query. In some embodiments, the search engine 140 updates the user interface (as more fully described below) with content metadata, peek boxes, related content item queries, or domain queries. The user interface may include a single page that includes the entire collection of content items. In some embodiments, the single page includes an infinite scroll component when the collection of content items is too large for the single page. The search engine may transmit placeholders, for example, gray boxes, that provide a temporary visual indication of the location for content items that match the query. In some embodiments, the temporary visual indications are replaced with thumbnails associated with the content items that match the query in a predetermined order, such as, for example, top-to-bottom, left-to-right, or randomly.

Figure 2:
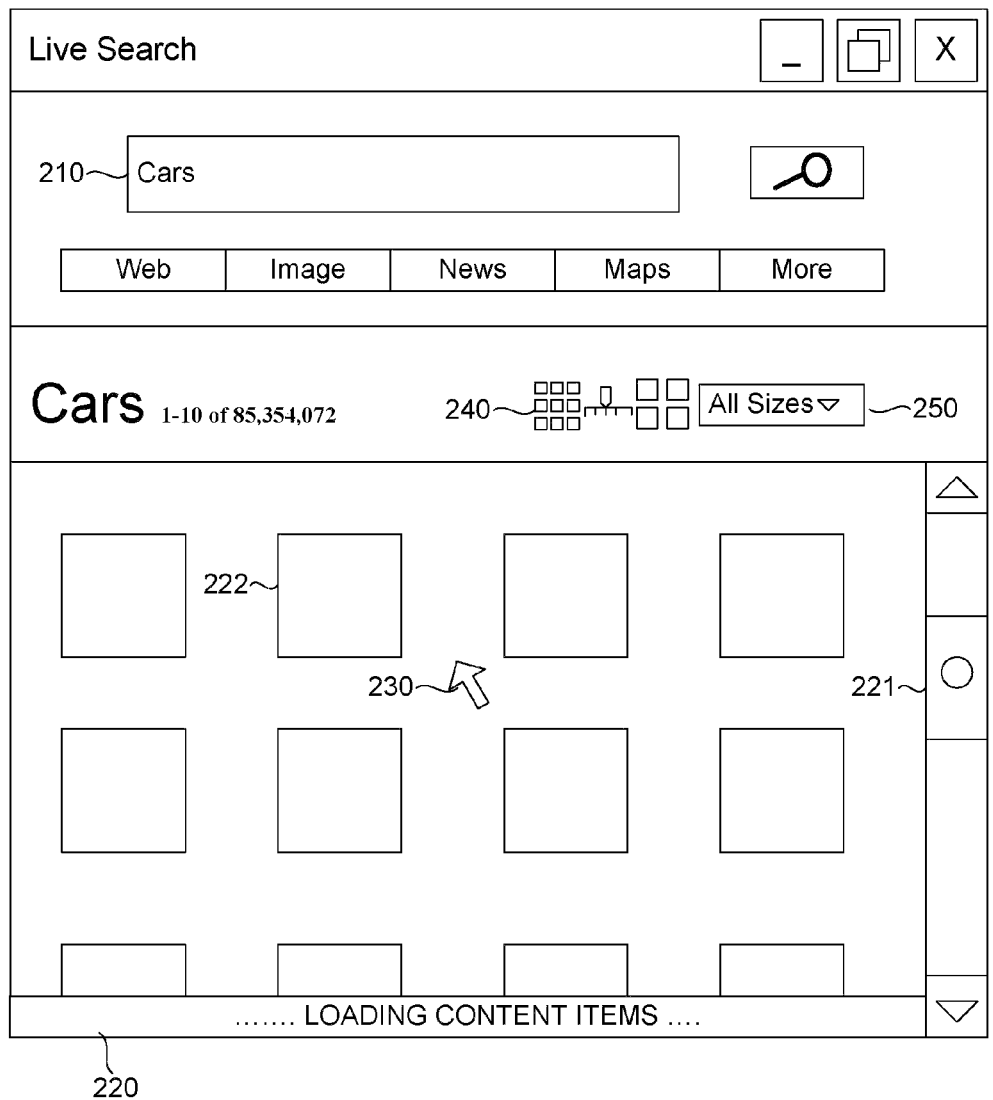
FIG. 2 is a screen shot that illustrates an exemplary user interface, according to embodiments of the present invention.

FIG. 2 is a screen shot that illustrates an exemplary user interface 200, according to embodiments of the present invention. The user interface 200 includes a query field 210, a display pane 220, a pointer 230, a scale control 240, and a filter drop down box 250.

The query field 210 is configured to receive query terms from one or more client devices, e.g., client devices 130 of FIG. 1. The client device may initiate a query after a user inputs terms in the query field 210. Once, the client device initiates the query, a search engine, e.g., search engine 140 of FIG. 1, stores the terms in a query log or database (e.g., query log 160 of FIG. 1) and accesses a content item index (for instance, content item index 170 of FIG. 1) to generate a collection of content items that match the terms entered in the query field 210. The collection of content items are selected from the content item index to ensure that the collection of content items includes content items from diverse domains. In some embodiments, the search engine may include a default feature that prevents the entire collection of content items from being selected from a single domain. Upon user request, the search engine may disable this feature during a search session.

The display pane 220 is configured to present a collection of content items to one or more client devices (e.g., client devices 130 of FIG. 1). The display pane 220 may be a single page that presents the entire collection of content items. In some embodiments, the display pane 220 includes placeholders 222, for instance, gray boxes, that provide a visual indication of a location where each content item will be displayed once thumbnails associated with the collection of content items are loaded. Also, the display pane 220 may be configured to include an infinite scroll component, visualized as scroll bar 221, that is utilized when the entire collection of content items is unable to be viewed by the user of the client device in the viewable area of the display pane 220. The infinite scroll component enables the client device to scroll through the entire collection of content items that match the query provided by client device without having to navigate between web pages.

The pointer 230 is configured to enable the client device to select or hover—over content items included in the collection of content items. In some embodiments, clicking on a content item may trigger the search engine to access a reference associated with the content item and generate a new window that contains the content items and any other related data. In other embodiments, hovering over the content item for a specified period of time may trigger the search engine to provide a related content item query, a domain query, or a peek box.

The scale control 240 is configured to enable the client device to control the size and/or resolution of the thumbnails displayed in association with the content items. In some embodiments, the user may set the scale control 240 to display small size thumbnails. Alternatively, the user may set the scale control 240 to display large size thumbnails. The search engine may access the content item index (e.g., content item index 170 of FIG. 1) to receive the appropriate size thumbnails based on the scale set on the scale control 240. The scale control 240 impacts the number of thumbnails that can be loaded in the viewable area of the display pane 220. A client device may adjust the scale control 240 to dictate the number of image that are viewable in the display pane 220. In an alternate embodiment, the scale control 240 may trigger the search engine to shrink or stretch thumbnails stored in the content item index.

The filter drop down box 250 is configured to allow one or more client devices to filter a returned collection of content items based on size or resolution. Here, the collection of content items is reduced to include only items that have a resolution or size, such as desktop size, wallet size, 8 in.×6 in., 800×600 pixels, or 150×150 pixels, as specified via the filter drop down box 250.

In some embodiments, the user interface may be updated with content metadata or related content item queries. During a search session the user may navigate and browse the collection of content items via the pointer 230 or scroll bar 221. Further, based on the level of user interaction during a search session, the content item metadata may be augmented with domain queries or references, or thumbnails associated with a subset of content items that match a related content item query for a particular content item.

Figure 3:
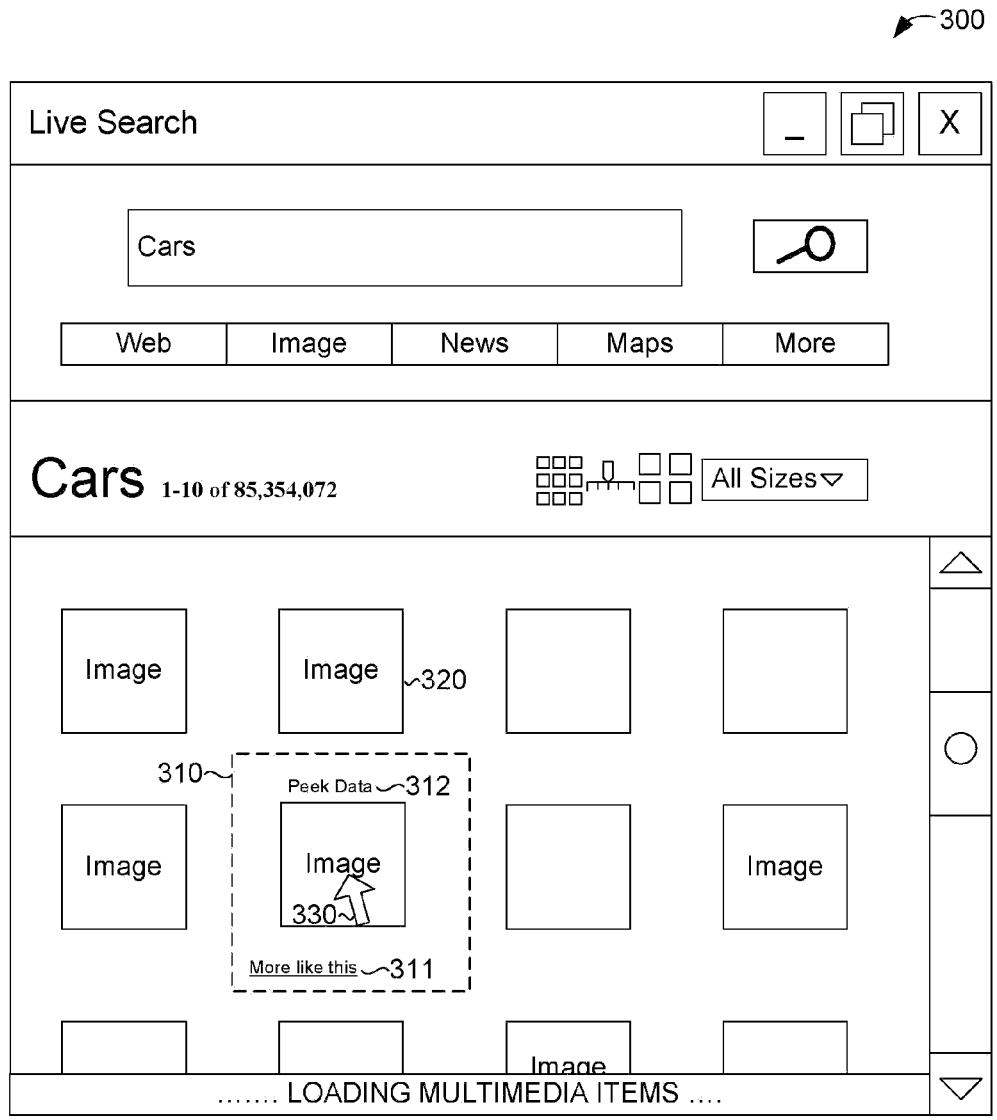
FIG. 3 is a screen shot that illustrates another exemplary user interface having a peek box, according to embodiments of the present invention.

Turning now to FIG. 3, a screen shot is shown that illustrates an exemplary user interface 300 having a peek box 310, in accordance with embodiments of the present invention. In some embodiments, when the reference or thumbnail 320 associated with a content item in the collection of content items is hovered-over or selected by a pointer 330 and one or more thresholds associated with user interaction data are exceeded, a peek box 310 is generated. The peek box 310 includes a reference 311 and peek data 312 that may include a thumbnail or reference associated with a particular content item in the collection of content items. The reference 311 may be a URL that represents the related content item query. In some embodiments, the peek data 312 may include content item metadata, such as, for example, file name, file size, or date accessed, associated with the particular content item. The peek data 312 may also include images or thumbnails located on the same page as the particular content item, images or thumbnails located on same domain as the particular content item, or images that are similarly using a predefined statistical measurement.

In certain embodiments, the particular content item is specified when the hover time associated therewith exceeds a predetermined hover-time threshold. In other embodiments, the particular content item is specified when the selection frequency or hover frequency associated with a content item is above a predetermined selection frequency threshold or hover frequency threshold, respectively. When the hover time, selection frequency, or hover frequency threshold is surpassed, the search engine triggers the advisor engine to generate the peek box 310.

Accordingly, based on the level of user interaction with the collection of content items, the search engine may transmit a peek box to the client device. The advisor engine utilizes the current user interaction data collected by the search engine, user interaction data stored in the query log, and the content item index to determine when to provide the peek box and what items to include in the peek box.

Figure 4:
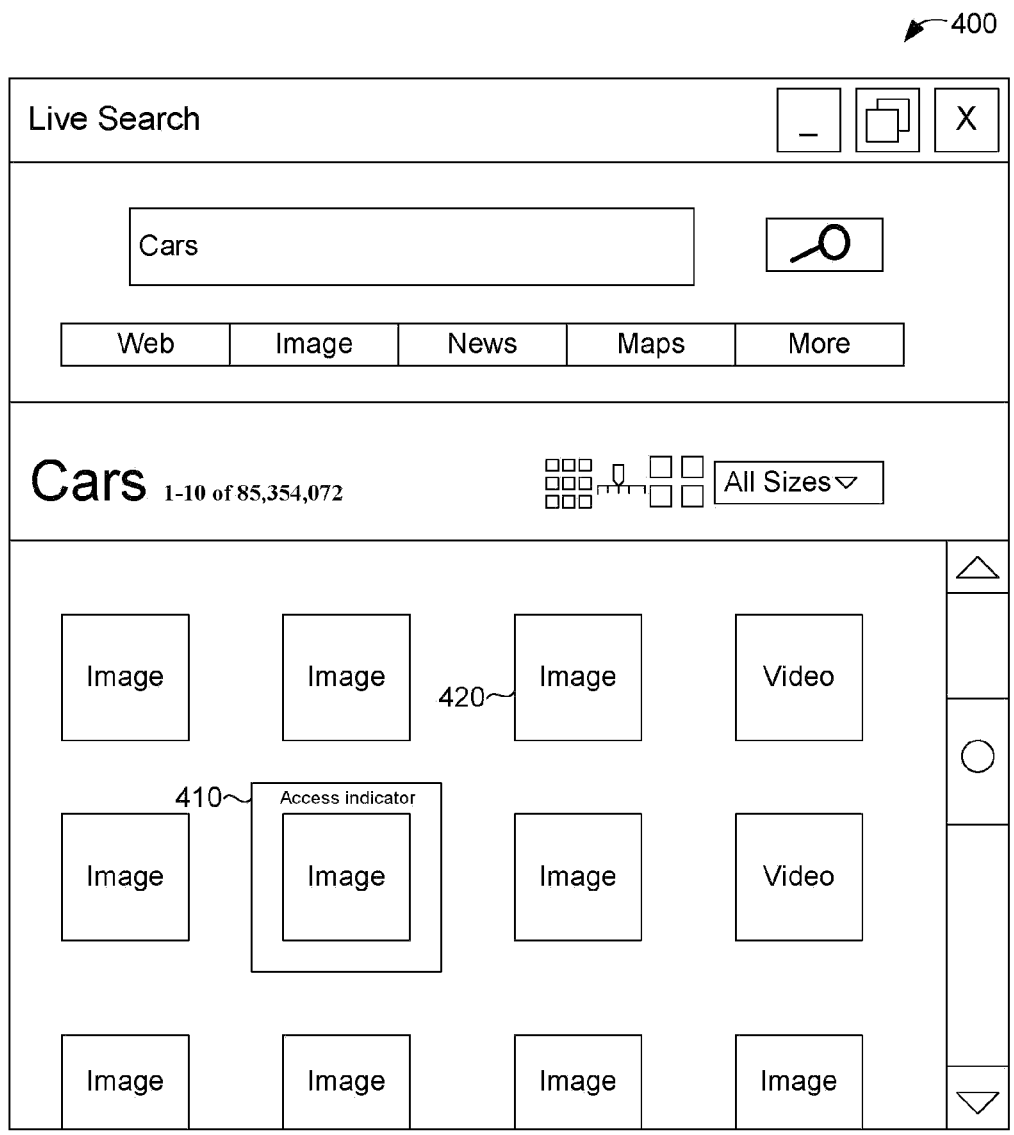
FIG. 4 is a screen shot that illustrates another exemplary user interface having an access indicator, according to embodiments of the present invention.

With reference to FIG. 4, a screen shot is shown that illustrates another exemplary user interface 400 having an access indicator 410, according to embodiments of the present invention. The user interface 400 includes references or thumbnails 420 associated with content items included in the collection of content items. After the client device has accessed a reference or thumbnail 420, an access indicator 410 is generated by the search engine and transmitted to the client device in response to a suggestion received from the advisor engine. In some embodiments the access indicator 410 may include a visible numerical identifier that is overlaid on the reference or thumbnail 420. In alternate embodiments, the access indicator 410 may be a border or colored shading that is added to the reference or thumbnail 420 that is accessed.

The reference or thumbnails 420 are accessed when a user associated with the client device uses the pointer (e.g., pointer 330 of FIG. 3) to select the reference or thumbnail 420 or when the pointer hovers over the reference or thumbnail 420 for a period of time that exceeds a predetermined threshold.

In some embodiments, the scroll bar may include access indicators that may be utilized to navigate the collection of content items. Such access indicators are illustrated and more fully described below with references to FIGS. 5A, 5B, and 5C. The search engine may periodically update the scrolling bar associated with the results page that contains the collection of content items returned during a search session. The updates may include visual indicators that represent locations of content items included in the collection of the content items that were accessed by the client device.

Figure 5A:
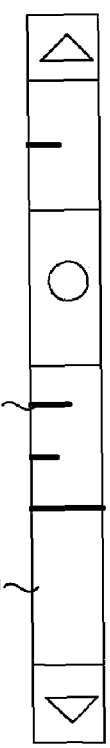
FIG. 5A-5C is a screen shot that illustrates exemplary infinite scrolling components associated with the user interface, according to embodiments of the present invention.
Figure 5B:
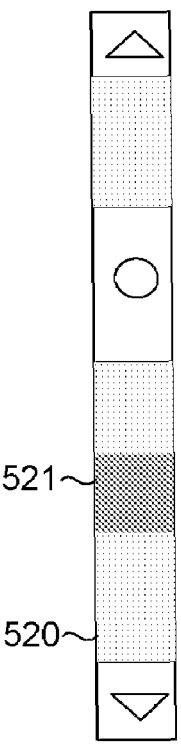
Figure 5C:
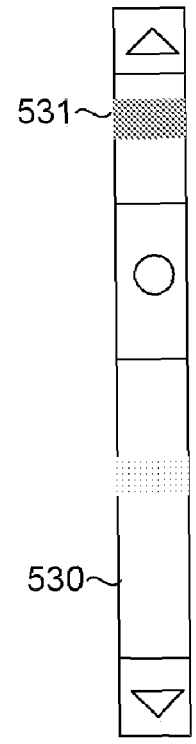

Turning now to FIGS. 5A, 5B, and 5C, screen shots are shown that illustrate exemplary access indicators 511, 521, and 531, associated with various scroll bars, 510, 520, and 530, respectively, according to embodiments of the present invention.

When a reference or content item in the collection of content items is accessed by the client device, the advisor engine may trigger the search engine to generate a visual indication on the scroll bar. As shown in FIG. 5A, the visual indication may include marks 511 that illustrate the access frequency of subsets of content items included at one or more locations on the scroll bar 510. In some embodiments, the subset of content items may include the collection of content items that are viewable simultaneously in the display pane of the single page. The marks 511 on the infinite scroll component 510 provide a visual indication of the relative access frequencies associated with subsets of content items included in the collection of content items. In the illustrated embodiment, the length of the mark 511 at a location on the scroll bar 510 is related to access frequencies associated with the subset of the collection of content items viewable at the location. For instance, a long mark 511 may indicate that the aggregate access frequencies of the subset of content items at that location is high. A small mark may indicate the aggregate access frequencies of the subset of content items at a location is low.

In FIG. 5B, the visual indication includes shaded regions 521 that illustrate the access frequency of subsets of content items included at one or more locations on the scroll bar 520. In some embodiments, the subset of content items may include the collection of content items that are viewable simultaneously in the display pane of a single page of results. The shaded regions 521 on the scroll bar 520 provide a visual indication of the relative access frequencies associated with subsets of content items included in the collection. A dark shade at a location on the scroll bar 520 may indicate that access frequencies associated with the subset of collection of content items viewable at the location is high. A light shade at a location on the scroll bar 520 may indicate that access frequencies associated with the subset of the collection of content items viewable at the location is low.

In FIG. 5C, the visual indication may include colored regions 531 that illustrate the access frequency of subsets of content items included at one or more locations on the scroll bar 530. In some embodiments, the subset of content items may include the collection of content items that are viewable simultaneously in the display pane of a single page of query results. The colored regions 531 on the scroll bar 530 provide a visual indication of the relative access frequencies associated with subsets of content items included in the collection of content items. A dark colored region at a location on the scroll bar 530 may indicate that access frequencies associated with the subset of collection of content items viewable at the location is high. A light colored region at a location on the scroll bar 530 may indicate that access frequencies associated with the subset of the collection of content items viewable at the location is low.

The user of the client device may utilize the visual indicators on the scroll bar to quickly return to content items having a high access frequency. Furthermore the user may utilize the visual indicators of the scroll bar in conjunction with access indicators of the content items to determine which content items in the collection of content items have not been accessed.

Embodiments of the present invention provide search engine updates that include, among other things, related content item queries and visual indicators that represent access data associated with content items included in a collection of content items that match the queries. A client device receives the search engine updates and may utilize the updates to enhance navigations during a search session. In some embodiments, the updates are provided when the collection of content items is not viewable within a display pane associated with a single page due to the size thereof.

Figure 6:
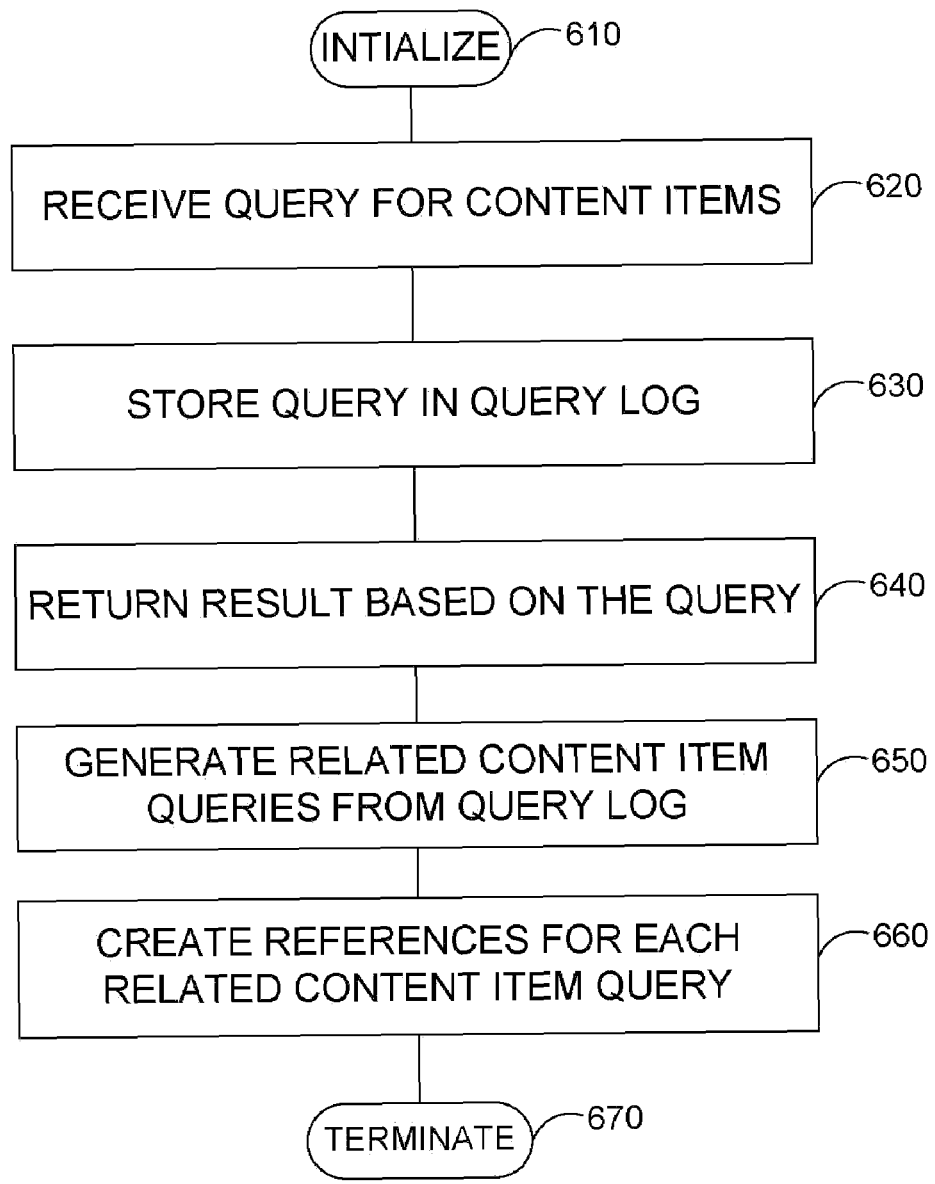
FIG. 6 is a flow diagram that illustrates an exemplary method to formulate related content item queries, according to embodiments of the present invention.

FIG. 6 is a flow diagram that illustrates an exemplary method to formulate related content item queries, according to embodiments of the present invention. The method initializes in the step 610 when the search engine is online. In step 620, the search engine receive queries for content items from a client device. In step 630, the queries are stored in a query log associated with the search engine. In step 640, a collection of content items is generated and transmitted to the client device. In turn, the search engine receives related content item queries, for each content item in the collection of content items, from an advisor engine that generated the related content item query based on, among other things, data stored in the query log, in step 650. In the step 660, the search engine generates references to related item content queries. In step 670, the method terminates.

Figure 7:
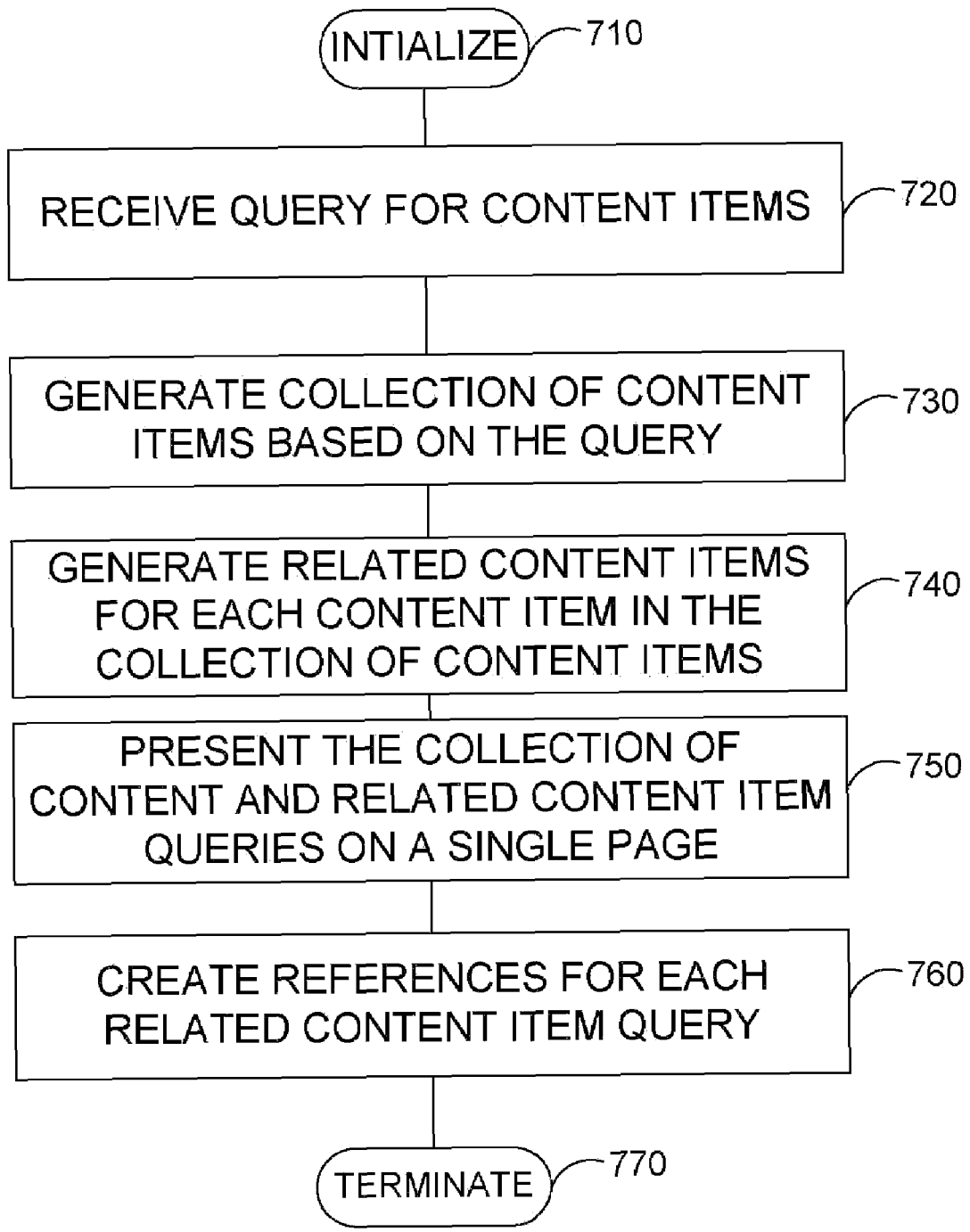
FIG. 7 is a flow diagram that illustrates an exemplary method to track location and access patterns during a search session, according to embodiments of the present invention.

FIG. 7 is a flow diagram that illustrates an exemplary method to track location and access patterns during a search session. The method initializes in the step 710 when the search engine is online. In step 720, the client device transmits queries for content items to the search engine and the search engine receives the queries. In step 730, the search engine generates a collection of content items that is based on the terms included in the queries. In turn, the search engine receives related content item queries, for each content item in the collection of content items, from an advisor engine that generated the related content item queries based on, among other things, data stored in the query log, in step 740. In step 750, the search engine presents the collection of content items and related content item queries on a single page. In step 760, the search engine creates a reference for each related content item query. In some embodiments, the related content items queries are hidden until a specified trigger condition occurs, such as, for example exceeding a hover time threshold.

The foregoing descriptions of the invention are illustrative, and modifications in configuration and implementation will occur to persons skilled in the art. For instance, while the present invention has generally been described with relation to FIGS. 1-7, those descriptions are exemplary. Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing the claims. The scope of the invention is accordingly intended to be limited only by the following claims.

The invention claimed is:

1. One or more computer-readable media having computer-executable instructions embodied thereon that perform a method for tracking location and accessing patterns during a search session, the method comprising:
   receiving a content item query;
   generating a collection of content items based on the content item query;
   for at least one content item in the collection of content items, generating without further user intervention a related content item query;
   presenting the collection of content items and the related content item queries on a single page, wherein the single page provides infinite scroll capability; and
   tracking content items in the content item collection that are selected or hovered over by a user, wherein tracking the content items includes at least one of embedding an identifier to indicate that a content item was selected or hovered over, altering a background associated with the content items that were selected or hovered over, or altering a border associated with the content items that were selected or hovered over.

2. The media of claim 1, wherein the related content item query includes terms provided in an alternative text tag associated with the content item or terms that are provided by a visual parser component, wherein the visual parser component is configured to provide terms that are extracted from at least one of a caption text associated with a content item included in a table, a domain name associated with the content item, or a file name associated with the content item.

3. The media of claim 1, wherein the related content item query includes at least one term within a predetermined proximity of the content item.

4. The media of claim 3, wherein the at least one term within the predetermined proximity of the content item is a term that is below, above, to the left, or to the right of the content item.

5. The media of claim 1, wherein generating the related content item query comprises processing the user interaction data to determine whether the content item has been selected or hovered-over in response to one or more other content item queries that differ from the first content item query.

6. The media of claim 5, wherein if the content item has not been selected or hovered-over in response to one or more other content item queries that differ from the first content item query, the method further comprises choosing a different source for query terms for the related content item query.

7. The media of claim 5, wherein if the content item has been selected or hovered-over in response to the one or more other content item queries that differ from the first content item query, the method further comprises choosing at least one query term from the one or more other content item queries to include in the related content item query.

8. The media of claim 7, wherein choosing at least one query term from the one or more other content item queries includes at least one of choosing the longest other content item query, choosing the most frequent other content item query, choosing the other content item query with a high statistical similarity to the content item, choosing content item queries that return a display of one or more popular results included in a group of results available from all content item queries in the query log, or randomly choosing the other content item query.

9. The media of claim 1, wherein the method further comprises generating a uniform resource locator that references the related content item query.

10. The media of claim 9, wherein hovering over the uniform resource locator or the content item triggers presentation of a peek box that includes a subset of content items associated with the related content item query.

11. The media of claim 10, wherein the box includes one or more uniform resource locators that reference at least one of a related content item query or a domain query that provides one or more additional content in associated with a domain associated with the content item.

12. One or more computer-readable media having computer-executable instructions embodied thereon that perform a method for tracking location and accessing patterns during a search session, the method comprising:
    receiving a content item query;
    generating a collection of content items based on the content item query;
    for at least one content item in the collection of content items, generating without further user intervention a related content item query; and
    presenting the collection of content items and the related content item queries on a single page, wherein the single page provides infinite scroll capability, wherein a scroll bar associated with the single page includes at least one of a colored region to indicate relative selection frequencies or hover frequencies for content items within the collection of content items or colored marks to indicate where a selection or hover occurred, wherein a length of the colored mark or colored region indicates a selection frequency or hover frequency for a subset of content items of the collection in content items.

13. The media of claim 12, wherein the method further comprises generating a uniform resource locator that references the related content item query.

14. The media of claim 13, wherein hovering over the uniform resource locator or the content item triggers presentation of a peek box that includes a subset of content items associated with the related content item query.

15. The media of claim 14, wherein the peek box includes one or more uniform resource locators that reference at least one of a related content item query or a domain query that provides one or more additional content items associated with a domain associated with the content item.

16. One or more computer-readable media having computer-executable instructions embodied thereon that perform a method for tracking location and accessing patterns during a search session, the method comprising:
  receiving a content item query;
  generating a collection of content items based on the content item query;
  for at least one content item in the collection of content items, generating without further user intervention a related content item query;
  detecting a connection speed; and
  presenting the collection of content items and the related content item queries on a single page, wherein the single page provides infinite scroll capability, wherein presenting the content item includes transmitting at least one thumbnail based, at least in part, on the detected connection speed.

17. The media of claim 16, wherein the at least one thumbnail differs in at least one of size and resolution based upon the detected connection speed.

18. The media of claim 16, wherein transmitting the at least one thumbnail includes generating a visible placeholder prior to transmitting the at least one thumbnail and wherein the method further comprises replacing the at least one visible placeholder with the transmitted at least one thumbnail.

19. The media of claim 18, wherein transmitting the at least one thumbnail comprises transmitting a plurality of thumbnails and includes generating a visible placeholder for each of the plurality of thumbnails prior to transmitting the plurality of thumbnails, and wherein replacing the at least one visible placeholder comprises replacing each of the plurality of visible placeholders with the plurality of thumbnails in accordance with a pre-determined methodology.

* * * * *